United States Patent [19]

Iwata et al.

[11] Patent Number: 4,632,530
[45] Date of Patent: Dec. 30, 1986

[54] AUTOMATIC FILM WINDING SYSTEM

[75] Inventors: Hiroshi Iwata, Nara; Katsuji Ishikawa, Osaka, both of Japan

[73] Assignee: West Electric Co., Ltd., Osaka, Japan

[21] Appl. No.: 231,436

[22] Filed: Feb. 4, 1981

[30] Foreign Application Priority Data

Feb. 15, 1980 [JP] Japan .................................. 55-18080

[51] Int. Cl.[4] .............................................. G03B 1/12
[52] U.S. Cl. ............................................... 354/173.11
[58] Field of Search ............................... 354/106, 173

[56] References Cited

U.S. PATENT DOCUMENTS 4,084,169  4/1978  Iwata et al. ......................... 354/173
4,104,658  8/1978  Uchiyama et al. ................... 354/106
4,272,171  6/1981  Hashimoto et al. ............. 354/173 X
4,294,527 10/1981  Hashimoto et al. ............. 354/173 X Primary Examiner—Michael L. Gellner
Attorney, Agent, or Firm—Burgess, Ryan & Wayne

[57] ABSTRACT

An automatic film winding system comprising in combination, a mechanical film winding or transport system including an electric motor and an optical film-advance sensing system comprising a light source and a light sensor for sensing the length of the film advanced in terms of one or more perforations of the film passed past a predetermined point. In response to the depression of a shutter button, a power supply is automatically connected to the light sensor and then to the electric motor and the light source when one exposure operation has been completed so that the film is advanced or wound. When a predetermined number of perforations has passed past the predetermined point and sensed by the optical sensing system; that is, after the film has been advanced by a predetermined length, the power supply is disconnected from the light sensor, the electric motor and the light source.

4 Claims, 3 Drawing Figures

AUTOMATIC FILM WINDING SYSTEM

BACKGROUND OF THE INVENTION

The present invention relates to an automatic film winding system for cameras.

Various types of automatic film winding systems or devices have been devised and demonstrated. In general, they comprise a film transport or winding system and a perforation sensing system. The film transport or winding system includes an electric motor drivingly coupled through a reduction gear means to a film winding means. The perforation sensing system detects the length of the film advanced by the film transport system.

A typical prior art automatic film winding system will be described below in conjunction with a 110-size film. The film is loaded in the camera body. When a shutter button is depressed, a shutter mechanism accomplishes one exposure operation. Then, an electric switch coupled to the shutter mechanism is turned on so that a power supply is automatically connected to the motor and subsequently the film is advanced from the pay-off chamber to the take-up chamber of a film cartridge. When the perforation sensing system has detected a predetermined number of perforations of the film which corresponds to the width or height of a frame, the displacement of a mechanical sensing element is transmitted through a linkage comprising a few components to the reduction gear means, causing it to be disconnected from the electric motor. Thus the film transport is interrupted; that is, the film has been advanced by one frame. The same steps are repeated every time when one exposure is made.

In a system disclosed in U.S. Pat. No. 4,084,169, after the perforation sensing system of the type described above has detected a predetermined number of perforations, an electric switch is operated through a linkage so that the electric motor can be stopped electrically.

In the prior art perforation sensing systems, a perforation sensing element is normally brought into contact with the surface of a film and engages with perforations as the film is advanced. As a result, the sensing element very frequently causes damage to the film surface and the perforations. Furthermore, particles scratched off from the film surface by the sensing element tend to cause serious damage to the emulsion on the film. In addition, every time when the film is advanced, it has different inertia. As a result, an over-advancement that is, the phenomenon that the film is still advanced even after the perforation sensing system has counted or detected a predetermined number of perforations, results. Alternatively, an under-advancement that is, the phenomenon that the film is not advanced by a predetermined length, results because the electric motor stops in response to the output from the perforation sensing system generated erratically before the system detects a predetermined number of perforations. The prior art perforation sensing systems have a further drawback in that the wear of their mechanical parts is unavoidable and subsequently erratic detections result, causing over- or under-advancements.

OBJECT OF THE INVENTION

In view of the above, the present invention has for its object to provide an automatic film winding system for cameras in which instead of the prior art perforation sensing systems or devices, which, as described previously, have many drawbacks, an optical perforation sensing system is employed and so skillfully combined with a film transport or winding system and a power supply control circuit that the above described drawbacks can be substantially overcome.

DESCRIPTION OF THE PREFERRED EMBODIMENT

Figure 1:
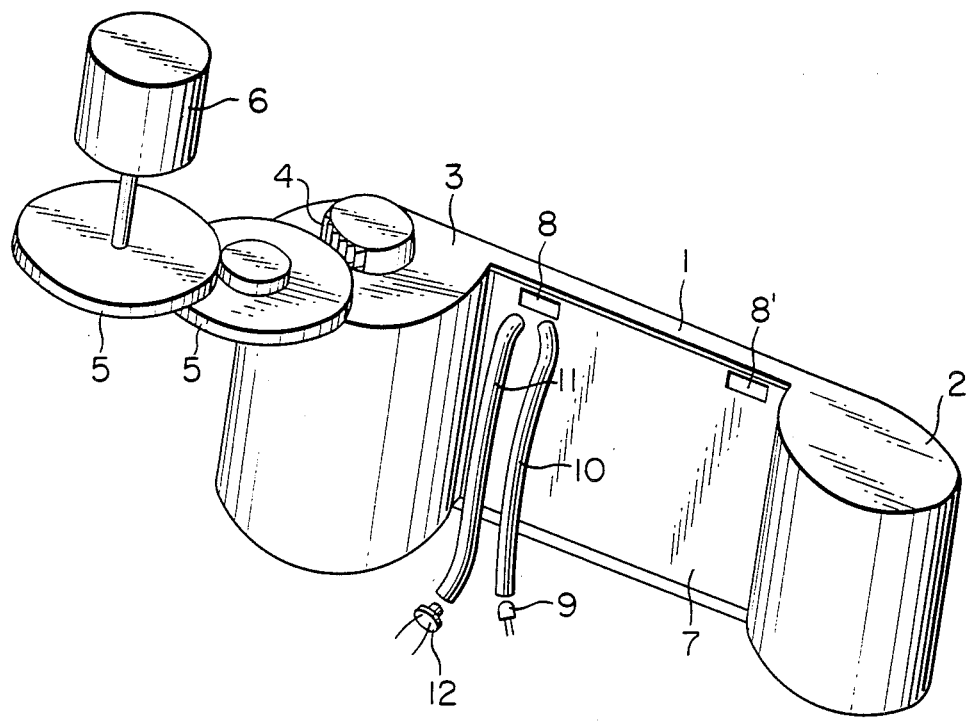
FIG. 1 is a schematic perspective view of an embodiment of an automatic film winding system in accordance with the present invention.

In FIG. 1 is shown in perspective an automatic film winding system in accordance with the present invention. Reference numeral 1 denotes a conventional 110-size film cartridge integral with a film pay-off chamber 2 and a film take-up chamber 3. A film winding gear 4 is drivingly coupled through a reduction gear 5 comprising a few toothed wheels to a motor 6. Light emitted from a light source 9 such as a tungsten lamp or a light emitting diode (LED) is transmitted through a first optical guide means 10, comprising optical fibers, to a perforation 8 of a film 7 and the light reflected from the perforation 8 or 8' or the film 7 is transmitted back through a second optical guide means 11 to a light sensor 12.

As is apparent from FIG. 1, when the motor 6 is driven, the film 7 is advanced from the pay-off chamber 2 to the take-up chamber 3 and wound.

The light source 9, the first and second optical guides 10 and 11 and the light sensor 12 constitute a photo- or optical-coupler which always illuminates the upper edge of the film 7 and transmits back to the light sensor 12 the light reflected from the film 7 or its perforation 8. In other words, the photo- or optical-coupler senses whether the returned light is reflected from the film 7 or the backing paper (not shown) through the perforation 8 or 8'. In general, the 110-size film comprises the film 7 and the backing paper which backs up the film 7 and is marked with a sequence of numbers for indicating a number of frames exposed. Since the film 7 and the backing paper are made of different materials, the light directly reflected back from the film surface is different in intensity from the light reflected back from the backing paper through the perforation 8 or 8'. Thus, the present invention utilizes the difference in intensity of the light reflected from the film 7 and the backing paper in order to detect the perforations of the film 7. More particularly, the output signal from the photo- or optical-coupler or the light sensor 12 is processed in an electronic circuit so as to control the operation of the motor 6 as will be described in detail below.

Obviously, the photo- or optical-coupler in accordance with the present invention can be used with conventional 35 mm films because it is evident that the light reflected directly back from the film surface and the light reflected back from the pressure plate or the like through a perforation are different in intensity and consequently can be distinguished from each other.

The light source 9 such as a tungsten filament lamp or a light-emitting diode is used, but if the film 7 were exposed with the light emitted from the light source 9, the present invention could not be used at all in practice. Thus, the position of the light source 9 or the wavelength of the light emitted from the light source 9 is selected carefully so that the unwanted exposure of the film 7 may be avoided. For instance, in the embodiment shown in FIG. 1, the optical guides 10 and 11 are used so that the film 7 can be avoided from being exposed unnecessarily. Furthermore, the use of such optical guides 10 and 11 will not result in any adverse effect on the design of other components of a camera.

As described above, the mechanical part of the automatic film winding system in accordance with the present invention, is very simple in construction yet highly reliable in operation.

Figure 2:
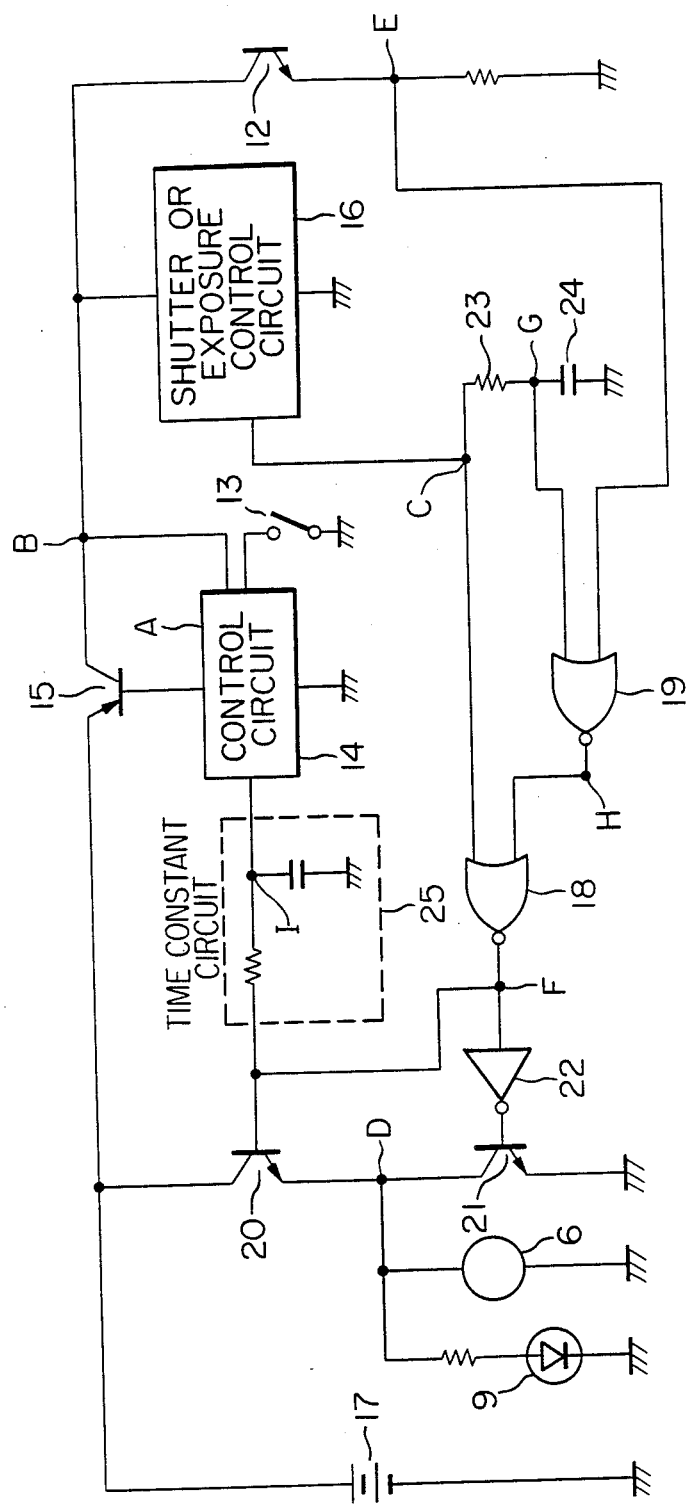
FIG. 2 is a diagram of the electronic circuit thereof.

Referring next to FIG. 2, the electronic part of the automatic film winding system will be described in detail. Reference numeral 13 represents a switch which is closed when a shutter release button (not shown) is depressed; 14, a control circuit which is enabled when the switch 13 is closed so as to control the operation of a transistor 15; 16, a shutter or exposure control circuit; 17, a power supply; 18 and 19, NOR gates; 20 and 21, transistors; 22, a NOT gate; 23, a resistor; 24, a capacitor; and 25, a time constant circuit which comprises a resistor and a capacitor and which controls the enabled time period of the control circuit 14 which in turn controls the transistor 15.

The mode of operation of the circuit shown in FIG. 2 will be described with further reference to FIG. 3 in which (a) shows ON signal from the switch 13 and (b), (c), (d), (e), (f), (g), (h) and (i) show the waveforms of the signals at the points A through I, respectively, shown in FIG. 2. When the shutter release button is depressed, the switch 13 is closed as shown at (a) in FIG. 3 and the control circuit 14 enables the transistor 15 as shown at (b), so that the current flows from the power supply 17 to the shutter or exposure control circuit 16 and the light sensor 12. Then the shutter (not shown) is opened and closed after a predetermined time. In this case, the shutter or exposure control circuit 16 delivers the output signal which lasts as long as the shutter is opened as shown at (c) in FIG. 3.

At a time $t_1$, the power supply 17 remains decoupled from the motor 6 and the light source 9, so that the light source 9 will not emit the light. Even though the current is supplied from the power supply 17 to the light sensor 12, the output of the latter is maintained at a lower level as shown at (e) in FIG. 3.

Figure 3:
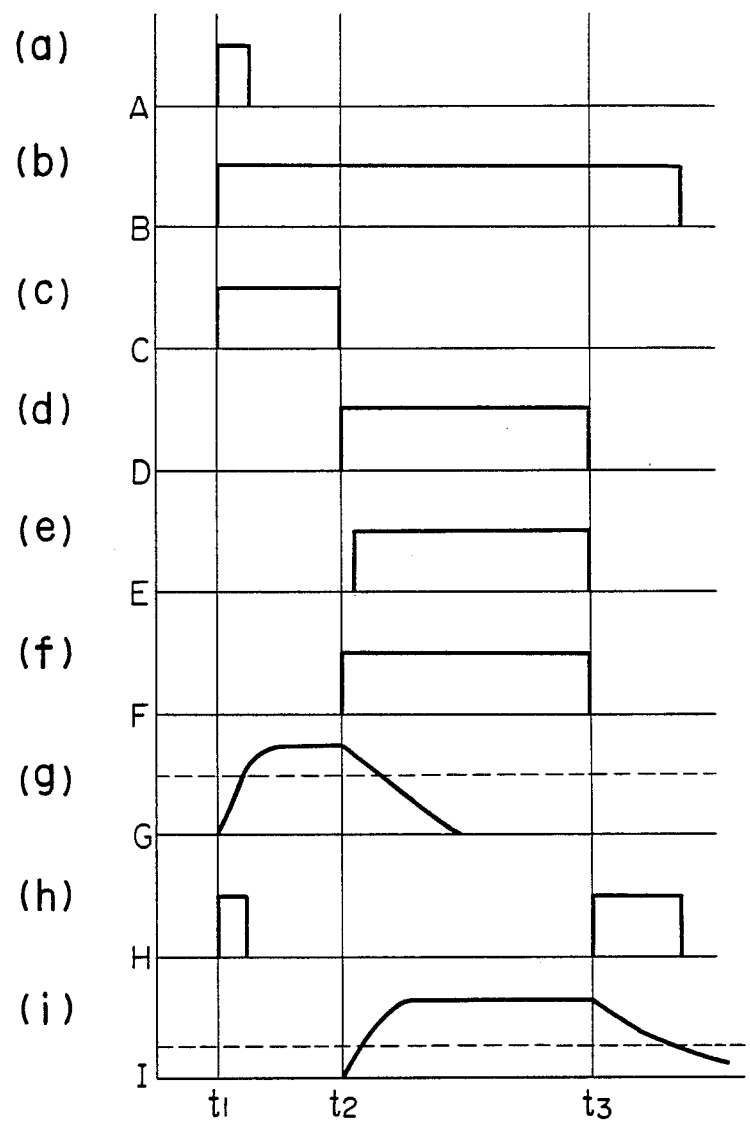
FIG. 3 shows the waveforms of signals at various points in the circuit shown in FIG. 2 and is used for the explanation of the mode of operation of the embodiment.

From the time $t_1$ to a time $t_2$, the output signal from the shutter or exposure control circuit 16 which is at a high level as shown at (c) in FIG. 3 is applied to the NOR gate 18 and to the NOR gate 19 through the resistor 23. The output signal from the NOR gate 18 remains at a low level as shown at (f) in FIG. 3. The high-level signal at the point C varies at the input terminal G of the NOR gate 19 as shown at (g) in FIG. 3 because of the series-connected resistor and capacitor arrangement. As a result, when the voltage across the capacitor 24 rises above a noninverting voltage level of the NOR gate 19, the output signal at the point H of the NOR gate 19 drops from a high level to a low level as shown at (h) in FIG. 3.

Since from the time $t_1$ to the time $t_2$, the output signal from the NOR gate 18 will not rise to a high level, the transistor 20 remains disabled during this time period and consequently the motor 6 and the light source 9 as well remains de-energized during the time when the shutter mechanism is executing its operation. During this period, the capacitor in the time constant circuit 25 will not be charged and the control circuit 14 continues its operation and the transistor 15 is kept enabled as shown at (b) in FIG. 3. Since the light source 9 is not energized, the light sensor 12 will receive no light, so that the potential at the point E remains at a low level as shown at (e) in FIG. 3.

At the time $t_2$, the shutter or exposure control circuit 16 completes its operation. Then the output signal at the point C drops to a low level as shown at (c) in FIG. 3. As a result, the input and output signals of the NOR gates 18 and 19 change as shown at (c), (h), (g), (e) and (f) in FIG. 3.

When the potential at the point C drops from a high level to a low level, the potential at the output terminal F of the NOR gate 18 rises from a low level to a high level as shown at (f) in FIG. 3. Then the transistor 20 is enabled so that the current flows from the power supply 17 to the motor 6 and the light source 9. Simultaneously, the capacitor in the time constant circuit 25 is charged as shown at (i) in FIG. 3. In response to a low level output signal from the NOT gate 22, the transistor 21, which has been enabled, is disabled. The transistor 21 has its collector and emitter connected in parallel with the motor 6 and its base is maintained at a high level when the potential at the point C is at a high level and consequently the potential at the point F is at a low level because the NOT gate 22 delivers the high-level output signal to the base of the transistor 21. Thus, the motor 6 is short-circuited through the transistor 21 and subsequently when an external disturbance is applied to the motor 6, the latter would function as a generator, but the transistor 21 is inserted as a load so that the motor 6 can be positively prevented from being driven. The transistor 21 will be, therefore, referred to as the "electric brake" in this specification for the sake of convenience.

When the power supply 17 is coupled to the motor 6 and the light source 9 in the manner described previously, the motor starts driving and the light source 9 emits the light for illuminating the film. As the motor 6 is driven, the film 7 is wound as described before. The light sensor 12 receives the light reflected back from the film 7. More particularly, when the winding of the film 7 has just started, the light sensor 12 receives the light reflected back from the backing paper through the perforation 8. This reflected light is low in intensity, so that the output signal; that is, the potential at the point E is maintained at a low level. However, when the perforation 8 has passed past the input end of the optical guide means 11, the light sensor 12 receives the light reflected back from the surface of the film 7. This reflected light is high in intensity, so that the output signal of the light sensor 12 rises to a high level as shown at (e) in FIG. 3. If the potential change from a high level to a low level at the point C were transmitted directly to the point G when the potential at the point E is at a low level, the potential at the output terminal H of the NOR gate 19 would become high and consequently the potential at the output terminal of the NOR gate 18 would become low. As a result, both the motor 6 and the light source 9 would be de-energized immediately. Thus a malfunction would result.

In order to prevent such malfunction, as shown at (g) in FIG. 3, the potential at the point G is maintained at a high level, even when the potential at the point C has dropped to a low level, for a time interval dependent upon a time constant of the resistor 23 and the capacitor 24. Thus, the motor 6 and the light source 9 are kept energized, so that the film is advanced while its upper edge is scanned from the light from the light source 9.

As the film 7 is advanced or wound, the next perforation 8' is brought in alignment with the input end of the second optical guide 11 and the output end of the first optical guide 10. Then the reflected light intercepted by the light sensor 12 suddenly drops in intensity, so that the output signal at the point E drops to a low level as shown at (e) in FIG. 3. At the time $t_3$, the potential at the point G has been already dropped to a low level as shown at (g) in FIG. 3. As a consequence, the potential at the output terminal H of the NOR gate 19 rises to a high level as shown at (h) in FIG. 3 and consequently the potential at the output terminal F of the NOR gate 18 drops to a low level as shown at (f) in FIG. 3.

Then the transistor 20 is disabled, so that the motor 6 and the light source 9 are disconnected from the power supply 17 and subsequently de-energized. On the other hand, the transistor 21 is enabled again, thus serving as the "electric brake" as described in detail previously. The capacitor in the time constant circuit 25 is discharged as shown at (i) in FIG. 3.

The operation of the control circuit 14 is controlled by the time constant circuit 25. More specifically, when the voltage across the capacitor in the time constant circuit 25 drops to a predetermined level, the transistor 15 is disabled as shown at (i) and (b) in FIG. 3 so that the shutter or exposure control circuit 16 and the light sensor 12 are disconnected from the power supply 17. Thus, the exposure of one frame and the advance of the film 7 that is, the advance of the next frame to the exposure position are completed.

When one 110-size film has been all exposed, the backing paper follows the trailing end of the film so that the reflected light received by the light sensor 12 is low in intensity as with the reflection through the perforations. Therefore, the motor 6 and the light source 9 are de-energized in a manner substantially similar to that described above.

Each frame of the 110-size film has one perforation, but each frame of the 35 mm film has a plurality of perforations. In the latter case, a frequency divider may be inserted between the output terminal of the light sensor 12 and the input terminal of the NOR gate 19 in such a way that when the light sensor 12 has counted a predetermined number of perforations that is, one pulse may be applied to the NOR gate 19. Thus, regardless of the number of perforations in each frame, the film can be advanced correctly by a predetermined length.

In the cases of the films having no backing paper, it is preferable to make the pressure plate black. Alternatively, a transmission type optical sensing system may be used in which a sensing element receives the light transmitted through a perforation or the base of a film.

So far, the present invention has been described in conjunction with the camera with the electronic shutter mechanism that is, the shutter or exposure control circuit 16, but it is to be understood that the present invention may be equally applied to the camera with a mechanical shutter. In that latter case, the shutter or exposure control circuit 16 may be replaced with a circuit which delivers an output signal similar to that shown at (c) in FIG. 3.

In summary, according to the present invention, the prior art mechanical perforation sensing systems which are extremely complex in construction can be replaced with the optical perforation sensing system in which a series of perforations and the spacing therebetween of a film is scanned with the sensing light ray when the film is being advanced and whether or not a perforation has been brought to a predetermined point or a predetermined number of perforations has passed past a predetermined position, is detected in terms of change in intensity of light reflected from the surface of the film or from the backing paper or the pressure plate through the perforation or change in intensity of the light passed through the perforation or the base of the film. Furthermore, the operation of the optical perforation sensing system is very effectively coupled with the motor for winding the film and the shutter release mechanism.

What is claimed is:

1. An automatic film winding system for winding film having a series of spaced perforations along an edge thereof, said system comprising:
   (a) a film advancing means comprising a film winding means drivingly coupled through a reduction gear means to an electric motor, for advancing film along a given path;
   (b) an optical perforation sensing means comprising:
      a light source disposed remote from said path;
      a light sensor disposed remote from said path;
      a first optical guide means extending transversely of said path, one end of said first optical guide means being optically coupled to said light source and the other end thereof being positioned adjacent and on one side of said path at a predetermined point past which a series of perforations of a film passes; and
      a second optical guide means extending transversely of said path, one end of said second optical guide means being optically coupled to said light sensor and the other end thereof being positioned adjacent and on said one side of said path at said predetermined point so that said light sensor receives the light reflected from the surface of the film or through a perforation thereof; and
   (c) a power supply control circuit including
      a first switching circuit adapted to be closed when a shutter release button is depressed;
      a power supply adapted to be selectively connected to or disconnected from said light sensor through said first switching circuit;
      a shutter or exposure control circuit adapted to be selectively connected to or disconnected from said power supply through said first switching circuit and further adapted to deliver the output signal which lasts as long as a shutter is opened;
      an arithmetic unit adapted to receive the outputs from said light sensor and said shutter or exposure control circuit;
      a second switching circuit responsive to the output from said arithmetic unit for controlling the power or current supply to said electric motor and said light source;
      a time constant circuit responsive to the output from said arithmetic unit for controlling said first switching circuit; and
      a third switching circuit connected in parallel with said electric motor and responsive to the output from said arithmetic unit for applying the electric brake to said electric motor, said power supply circuit being responsive to both the outputs from said first switching circuit, said shutter or exposure control circuit and said light sensor, thereby controlling the power supply to said electric motor, said light source and said light sensor; said power supply control circuit being so designed and constructed that in response to the depression of said shutter release button said power supply control circuit connects said power supply to said light sensor and when one exposure operation has been completed, said power supply control circuit connects said power supply to said electric motor and said light source and in response to the output from said light sensor said power supply control circuit disconnects said power supply from said light sensor, said electric motor and said light source;

whereby in response to the detection of one or more perforations of the film at said predetermined point, the length of the film advanced is determined.

2. An automatic film winding system as set forth in claim 1 wherein
said electric motor is controlled with an electric brake means.

3. An automatic film winding system as set forth in claim 1 wherein
said first optical guide means and said second optical guide means are made of glass fibers, respectively.

4. An automatic film winding system as set forth in claim 1 wherein
said film is 110-size film.

* * * * *